US007597227B2

(12) United States Patent
Blessing et al.

(10) Patent No.: US 7,597,227 B2
(45) **Date of Patent: *Oct. 6, 2009**

(54) POSITIONING DEVICE WITH ACTUATING SWITCHING MEANS FOR A HAND-HELD SETTING TOOL

(75) Inventors: Matthias Blessing, Frastanz (AT); Markus Sprenger, Mauren (LI)

(73) Assignee: Hilti Aktiengesellschaft, Schaan (LI)

( * ) Notice: Subject to any disclaimer, the term of this patent is extended or adjusted under 35 U.S.C. 154(b) by 55 days.

This patent is subject to a terminal disclaimer.

(21) Appl. No.: 11/977,630

(22) Filed: Oct. 24, 2007

(65) Prior Publication Data

US 2008/0106019 A1 May 8, 2008

(30) Foreign Application Priority Data

Nov. 8, 2006 (DE) ...................... 10 2006 035 410

(51) Int. Cl.
*B23Q 3/18* (2006.01)

(52) U.S. Cl. .............................. 227/8; 227/10; 227/119

(58) Field of Classification Search ..................... 227/8, 227/10, 110, 119
See application file for complete search history.

(56) References Cited

U.S. PATENT DOCUMENTS

| | | | | |
|---|---|---|---|---|
| 2,724,718 | A | 11/1955 | Stiles et al. | 260/461 |
| 3,001,938 | A | 9/1961 | Clark et al. | 252/32.5 |
| 3,206,442 | A | 9/1965 | Groenweghe | 260/79 |
| 3,374,228 | A | 3/1968 | Fried | 260/239.55 |
| 3,556,379 | A * | 1/1971 | Bayer et al. | 227/10 |
| 3,718,271 | A * | 2/1973 | Schneider | 227/10 |
| 3,915,242 | A * | 10/1975 | Bell | 173/206 |
| 4,374,780 | A | 2/1983 | Robertson | 562/8 |
| 4,479,599 | A * | 10/1984 | Conrad | 227/9 |

(Continued)

FOREIGN PATENT DOCUMENTS

DE 1 054 453 2/1958

(Continued)

OTHER PUBLICATIONS

Fedorova, G K et al. Zhurnal Obshchei Khimii (1982), 52(1) 214 Chem Abst. 96:181355.

(Continued)

*Primary Examiner*—Brian D Nash
(74) *Attorney, Agent, or Firm*—Abelman, Frayne & Schwab

(57) ABSTRACT

A positioning device for a hand-held setting tool (10) includes an actuating switching device having an actuation element (24), a switching link (30) for connecting an actuation element (24) to the actuation switch (13) of the setting tool (10) and having a switching member axially displaceable relative to a stationary, with respect to the holder, structural component. The device further includes a safety device (50) for preventing actuation of the actuation switch (13) at a predetermined orientation of the setting tool (10). The safety device (50) includes a displaceable blocking element (55), first and second annular recesses (51, 52) for receiving the blocking element and extending radially circumferentially about the structural component and about the switching member, respectively. The first (51) and the second (52) annular recesses are open toward the switching member and the structural component, respectively. The blocking element (55) is completely positionable in one of the first and second annular recesses (51) in an operational position of the actuation switching means.

8 Claims, 4 Drawing Sheets

U.S. PATENT DOCUMENTS

| | | | | |
|---|---|---|---|---|
| 4,577,793 | A * | 3/1986 | Jochum | 227/10 |
| 4,655,380 | A * | 4/1987 | Haytayan | 227/9 |
| 6,196,330 | B1 * | 3/2001 | Matthias et al. | 173/48 |
| 6,364,190 | B1 * | 4/2002 | Tor | 227/10 |
| 7,014,085 | B2 * | 3/2006 | McCullough | 227/8 |
| 2004/0050897 | A1 * | 3/2004 | Popovich et al. | 227/10 |
| 2008/0029567 | A1 * | 2/2008 | Blessing et al. | 227/10 |
| 2008/0099524 | A1 * | 5/2008 | Blessing et al. | 227/2 |

FOREIGN PATENT DOCUMENTS

| | | |
|---|---|---|
| DE | 1 067 017 | 9/1958 |
| SU | 221695 | 5/1967 |
| SU | 347332 | 11/1969 |

OTHER PUBLICATIONS

Kaushik, M.P. et al Indian J. Chem. Sect B: Org. Chem. Med. Chem (1991), 20B(10), 932.

* cited by examiner

POSITIONING DEVICE WITH ACTUATING SWITCHING MEANS FOR A HAND-HELD SETTING TOOL

BACKGROUND OF THE INVENTION

1. Field of the Invention

The present invention relates to a positioning device for a hand-held setting tool having an actuation switch for actuating the setting tool, with the positioning device including a rod-shaped holder defining a longitudinal axis, connection means for the setting tool arranged at an end of the holder, actuating switching means for actuating the actuation switch of the setting tool and including an actuation element, a switching link that connects the actuation element with the actuation switch of the setting tool, and a safety device for preventing actuation of the actuation switch of the setting tool at a predetermined orientation of the setting tool.

2. Description of the Prior Art

Positioning devices of the type described above are used, e.g., at overhead works with hand-held setting tools in case of high ceilings when working is possible only using working platforms or ladders. Setting tools, which can be used with such devices, can be driven with solid, gaseous, or liquid fuels or with compressed air or electricity.

U.S. Pat. No. 4,479,599 discloses a positioning and actuation device for a combustion-operated setting tool and including connection means for the setting tool, which is arranged at an end of an elongated holder and is formed as a rod or a bar. The rod or bar is axially displaceable relative to the connection means for actuating the actuation switch of the setting tool secured on the connection means via coupling means. For actuating the setting tool, the tool should be placed with its muzzle part against a ceiling and then be displaced in the direction of the ceiling with the holder or rod by the user.

Further, the positioning and actuation device has a safety device which prevents the setting tool from being actuated when the muzzle part is oriented exactly in direction of the force of gravity. For this purpose, the safety device has a blocking element formed as a ball which is guided in a recess formed as a channel and extending in the connection means diagonally to the longitudinal axis of the rod. At an orientation of the tool in the direction of the gravitational force, the ball rolls into the movement path of the rod and prevents a further movement of the rod relative to the connection means and, therefore, prevents actuation of the setting tool secured on the connection means. To this end, the rod has, at its end adjacent to the connection means, a radially circumferential recess into which the ball can fall.

The drawback here consists in that the actuation of the setting tool can only be safely prevented when the positioning and actuation device with the setting tool is oriented exactly with the muzzle part facing in direction of the force of gravity.

U.S. Pat. No. 7,014,085 discloses an explosion-actuated setting tool having a housing, an elongated holder projecting therefrom, and a ball-controlled safety locking device which permits the setting tool to be actuated only in a vertical or almost vertical orientation opposite to the force of gravity. The ball of the ball-controlled device is arranged in an annular receiving space between the holder and the housing.

However, the drawback of the setting tool of U.S. Pat. No. 7,014,085 consists in that the diameter of the ball defines the maximum movement path of the holder relative to the housing which is available in the release position of the ball and within which all of the necessary functions such as, e.g., initiating of ignition, must be carried out. Therefore, a very high pressing force is needed for this short movement path.

Another disadvantage consists in that widely differing angles result when the setting tool is lifted upward until released, and when the setting tool is lowered until blocked again; that is, the limiting angle at which a setting process is still possible when the setting tool deviates from a vertical orientation opposite to gravitational force can vary depending on the changes in orientation of the setting tool prior to actuation.

SUMMARY OF THE INVENTION

An object of the present invention is a positioning and actuation device of the type mentioned above which overcomes the drawbacks described above and which makes possible a sufficiently long movement path of the holder relative to the setting tool when pressing against a workpiece while at the same time requiring a small expenditure of force.

This and other objects of the present invention, which will become apparent hereinafter, are achieved according to the invention, by providing a positioning device the safety device of which includes a first annular recess for receiving the blocking element and extending radially circumferentially about a stationary, with respect to the connection means, structural component, and a second annular recess extending radially circumferentially about the switching member and located, at least in an initial position of the positioning device radially opposite the first annular recess. The first annular recess and the second annular recess are open toward the switching member and the structural component, respectively. The blocking element is completely positionable in one of the first and second annular recesses in an operational position of the actuation switching means.

The safety device acts in a rotationally symmetrical manner in identical tilting positions. Therefore, the blocking position of the safety device is achieved not only at certain orientation of the positioning device, but also remains rotationally symmetrical to the longitudinal axis in other tilting positions of the setting tool which deviate from the permissible orientation. For example, the blocking position can always be initiated when the positioning device is moved into a tilting position relative to the vertical (i.e., the orientation opposite to the vector of the force of gravity) which exceeds a maximum permissible tilting angle. On the other hand, the required stroke of the switching link can be longer than the maximum extension or dimension of the blocking element or blocking ball. Therefore, the functions which are controlled by the press-on path such as, e.g., the actuation of the setting tool or the transport of cartridges in powder-operated setting tools can be designed based on the optimal force/path behavior. Therefore, high press-on forces can be avoided. It may also be desirable that the setting tool can be actuated when the positioning device is arranged in an orientation in direction of the vector of the force of gravity and/or in a tilted position relative to this orientation.

The structural component in which the first annular recess is arranged is advantageously formed by a portion of a coupling element. This coupling element belongs to the supporting structure at which the switching link with its moving parts is guided so that, in an orientation in which a setting process is possible, the safety device is relatively far down in the line of mass so that the forces acting on the ball and blocking element are smaller during blocking.

Alternatively, the structural component element could also be formed, e.g., by a grip piece or by the connection means.

It is advantageous when the switching member with the second recess is a first switching member of the switching link which is sleeve-shaped and is guided over the radial outer surface of the portion of the coupling element. This enables a compact construction and a simple integration of the safety device in the positioning device.

It is further advantageous when the recesses are formed as annular grooves which are closed in both axial directions so that a closed receiving space is provided for the blocking element or blocking ball between the first switching member and the portion of the coupling element.

One of the recesses advantageously has a pocket-shaped depression whose maximum length is greater than the greatest extension (or diameter) of the blocking element, and the other recess has a maximum radial depth which is smaller than the radial extension (or diameter) of the blocking element. The depression forms a space into which the blocking element can move entirely in an operational position of the actuation switching means in a gravity-controlled manner, while in the blocking position it lies partly in the first recess and partly in the second recess and, accordingly, does not permit a movement of the two parts relative to one another or, if so, only for a short stroke path.

The pocket-shaped depression is advantageously defined axially at its end remote from the connection means by an inclined surface which is inclined from the outer side to the inner side toward the free end of the holder relative to the longitudinal axis of the holder. The angle of inclination of the inclined surface relative to the longitudinal axis defines, in a simple manner, the maximum permissible tilting angle of the positioning device relative to the vertical at which the blocking element still remains in the depression and, therefore, in the actuation position of the actuation switching means.

A clearance angle or releasing angle of 15° to 30° for the actuation switching means position is advantageously achieved with an angle of inclination of the inclined surface to the longitudinal axis in the range of 60° to 75°.

It is also advantageous when the recesses form conical boundary surfaces at their axial ends remote from the free end, which conical boundary surfaces narrow the recesses in the direction away from the free end of the holder. This results in a surface support in the blocking position so that the blocking element or ball blocks in a reliable manner in the perpendicular orientation in direction of the vector of gravitational force. Further, a jamming of the ball or blocking element is prevented at an inclination in direction of the vector of gravitational force so that when moving into a different position this ball or blocking element can roll out again from the funnel that is formed.

The novel features of the present invention which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
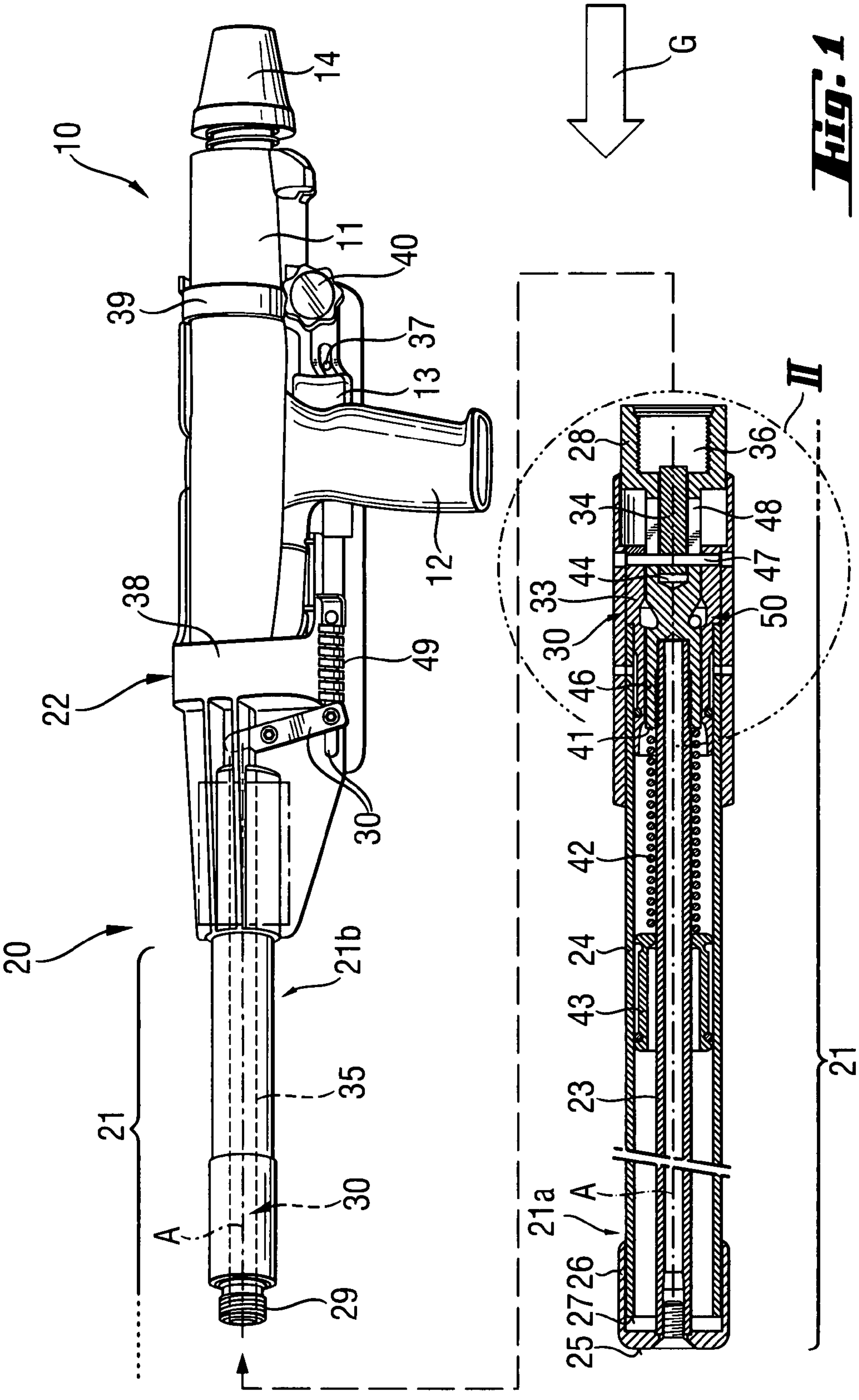
FIG. 1 a partially exploded view of the positioning device according to the invention with an actuating switching means and with a hand-held setting tool, which is arranged at connection means, in a non-pressed position.
Figure 3:
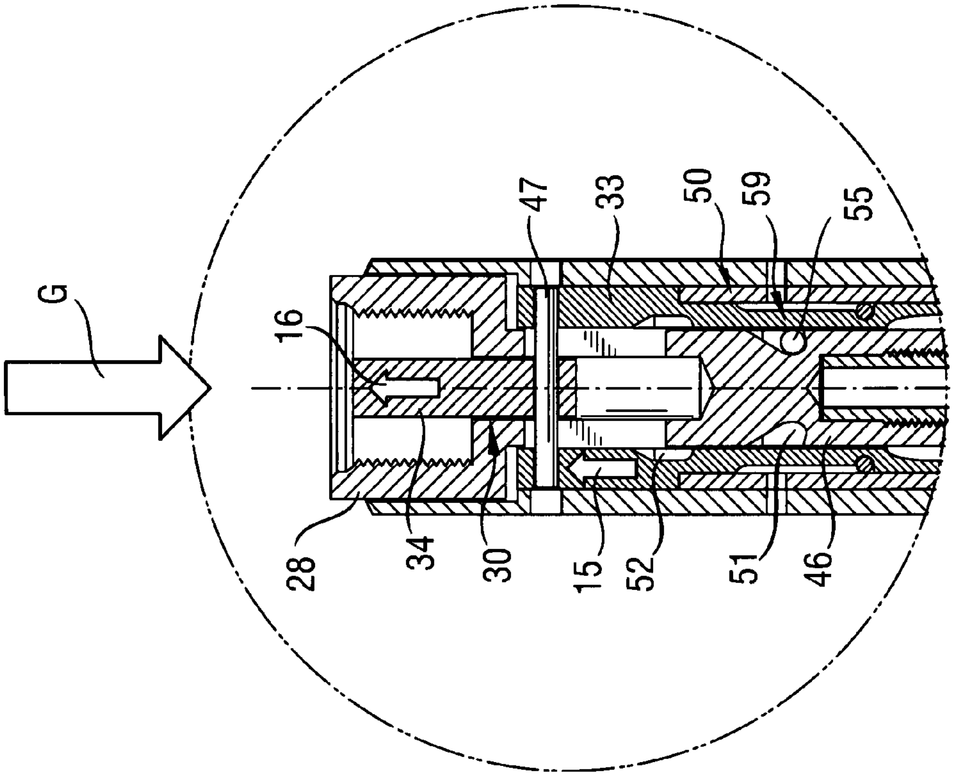
FIG. 3 a cross-sectional view of the detail of the positioning device shown in FIG. 2 in the actuated position.

FIGS. 1 to 5 show a positioning device 20 according to the invention with actuating switching means for a hand-held setting tool 10 and which can be formed a modular unit, for example. In the complete positioning device 20, the parts **21*a* and 21*b* of a rod-shaped holder 21, which are shown in FIG. 1 are coupled with one another by a coupling element 28 and a counter-coupling element 29. The connection between the coupling element 28 and the counter-coupling element 29 is detachable so that the positioning device 20 can be assembled and disassembled. One or more lengthening elements, not shown in the drawings, may be added between the two parts 21*a* and 21*b* of the rod-shaped holder 21. The longitudinal extension of the rod-shaped holder 21 defines a longitudinal axis A of the positioning device 20**.

The setting tool 10 shown in FIG. 1 has a setting mechanism arranged in a housing 11 and having one or more parts for driving fastening elements into a constructional component. An actuation switch 13 is arranged at a holder 12 of the setting tool 10 for actuating a setting process. A muzzle part, designated in its entirety by 14, is arranged at the setting tool 10 in front of the housing 11 and can be displaced relative to the housing 11. When the muzzle part 14 of the setting tool 10 is pressed against a construction component (not shown in the drawings), the setting tool 10 changes to a ready state in which a setting process can be actuated by the actuation switch 13. The positioning device 20 has a switching link 30 by means of which the actuating switching means is connected with the actuation switch 13 of the setting 10. The actuating switching means includes an actuation element 24 of the rod-shape holder 21. Accordingly, the actuation element 24 acts as a remote actuation switch.

As can be seen from FIG. 1, the hand-held setting tool 10 is arranged at connection means 22 of the positioning device 20 and is reversibly secured thereto by first holding element 38 and second holding element 39. The setting tool 10 can be detached from the connection means 22 by loosening the screw means 40 of the second holding element 39.

The first part **21*a* of the rod-like holder 21 has an actuating element 24 which is formed as an elongated actuating sleeve and which is guided at a supporting element 23 of a supporting structure, which supporting element 23 is formed as a hollow bar. As an alternative to an actuating sleeve, an actuating lever could also be used and, e.g., arranged at a grip part at an end of the holder 21 remote from the coupling element 28**.

The actuating element 24 is displaceable parallel to the longitudinal axis A relative to the supporting element 23. A base part 26 which projects over an axial end 27 of the actuating element 24 remote from the connection means 22 is arranged at a free end 25 of the supporting element 23 or holder 21 remote from the connection means 22. The supporting element 23 is fixedly connected to a coupling element

28 having a receptacle 36 for a counter coupling element 29 at its end remote from the supporting element 23. A support point 41 for a spring element 42 is formed at an end of the coupling element 28 facing the base part 25. The spring element 42 is supported with its other end against the actuating element 24 by an intermediate element 43 formed as an inner sleeve and elastically loads the latter in direction of its initial position which is shown in FIG. 1. The intermediate element 43 is fixedly connected to the actuating element 24.

The actuating element 24 is connected to a sleeve-shaped, first switching member 33 of the switching link 30 which at least partially surrounds a portion 46 of the coupling element 28 that is secured to the supporting element 23. The first switching member 33 cooperates with a second switching member 34 of the switching link 30 which is formed as a pin and which is displaceably guided in a guide 44 in the coupling element 28 that is formed as a blind hole. The first switching member 33 is in turn connected to the second switching member 34 by a connection element 47 which extend perpendicular to the longitudinal axis A and is formed as a stud. The connection element 47 penetrates slit-shaped openings 48 in the portion 46 of the coupling element 28 which make it possible for the connection means 47 to be displaced relative to the coupling element 28 and parallel to the longitudinal axis A.

The connection means 22 is arranged at the second part 21*b* of the rod-shaped holder 21. At its end remote from the connection means 22, this second part 21*b* of the rod-shaped holder 21 has an annular counter coupling element 29 which, as has already been described, can be inserted into the receptacle 36 of the coupling element 28. The connection between the coupling element 28 and the counter coupling element 29 is detachable so that the positioning device 20 can be assembled and disassembled.

Further, in the second part 21*b*, the rod-shaped holder 21 has a third switching member 35 of the switching link 30 which cooperates with the second switching member 34 when the coupling element 28 and the counter coupling element 29 are connected to one another. The third switching member 35 is rod-shaped and is guided in an interior space of the second part 21*b* of the rod-shaped holder 21. At the transition from the rod-like holder 21 to the connection means 22, the third switching member 35 can be coupled with additional switching members of the switching link 30 at least in the movement direction toward the connection means 22. Further, a driver 37 which cooperates with the actuation switch 13 of the setting tool 10 arranged at the connection means 22 is arranged at a free end of the switching link 30 at the connection means 22. The switching link 30 at the connection means 22 is acted upon by the driver 37 via spring means 49 in direction of its inactive position, shown in FIG. 1, in which the driver 37 does not press against the actuation switch 13 of the setting tool 10.

Further, the positioning device 20 has a safety device, designated in its entirety by 50 (see especially FIGS. 2 to 6), which prevents the setting tool 10 arranged at the positioning device 20 from being actuated by the actuating element 24 in an orientation other than the permitted orientation. This safety device 50 is arranged between a structural component of the supporting structure—the portion 46 of the coupling element 28 remote from the receptacle 36 in the present embodiment example—and a switching member of the switching link 30 which is displaceable axially along the longitudinal axis A, the first switching member 33 in the disclosed embodiment. The safety device 50 has a first annular recess 51 on the radial outer side in portion 46. The first annular recess 51 opens toward the first switching member 33 and has a radially circumferential pocket-shaped depression 53 at its axial end facing the support point 41. The pocket-shaped depression 53 is defined at its axial end facing the free end 25 by an inclined surface 56 which is inclined at an angle of inclination α of about 75° from the outer side to the inner side toward the free end 25 of the holder (21) relative to the longitudinal axis A. Further, the first annular recess 51 has a first conical boundary surface 54 which slopes upward toward the radial outer side from the pocket-shaped depression 53 to its other axial end. The cone angle of the first conical boundary surface 54 relative to the longitudinal axis A is in the range of about 25° to 35°, although other cone angles are also possible. Further, the safety device 50 has a second annular recess 52 on the radial inner side in the first switching member 33. The second annular recess 52 opens toward portion 46 and has a radial depth T which is less than a maximum length L of the pocket-shaped depression 53. The second annular recess 52 has a second conical boundary surface 57 at its end facing the connection means 22 whose angle of inclination relative to the longitudinal axis A corresponds, with the opposite mathematical sign, to the angle of inclination of the first conical boundary surface 54.

Further, the safety device 50 includes a blocking element 55 which is formed as a ball and whose dimension or diameter is selected in such a way that it can be received in its entirety in the pocket-shaped depression 53, i.e., the maximum extension D of the blocking element 55 or the diameter of the ball is smaller than the maximum length L of the pocket-shaped depression 53 and also smaller than its axial height. However, the radial extension E or the diameter of the blocking element 55 is greater than the radial depth T of the second recess 52.

Figure 2:
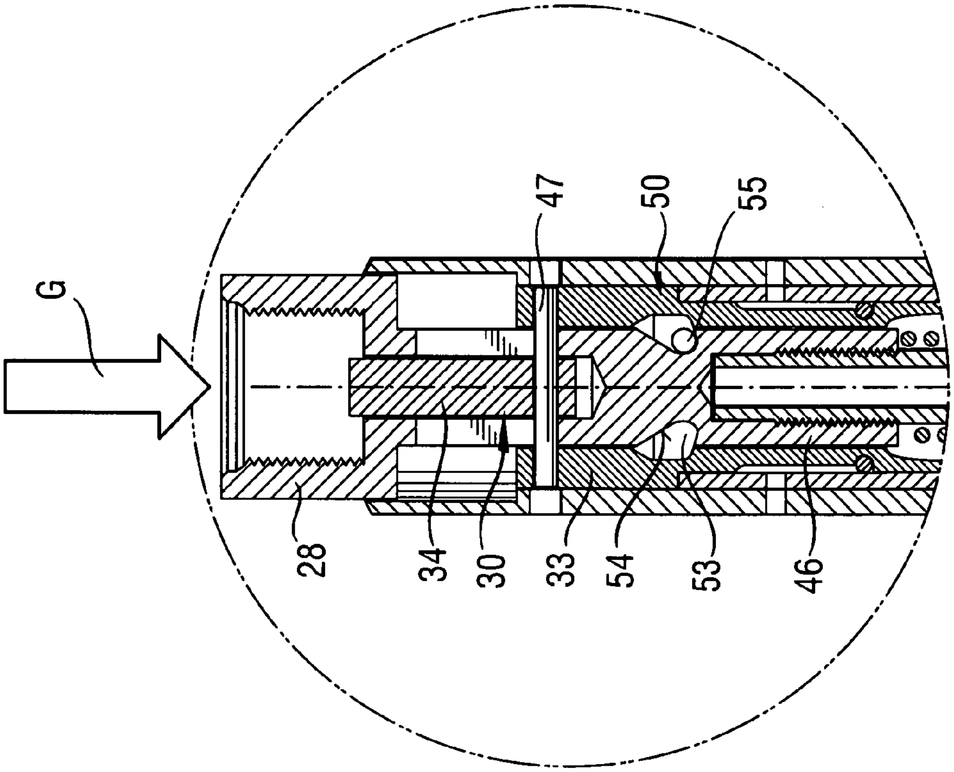
FIG. 2 a cross-sectional view at an increased, in comparison with FIG. 1, scale, of a detail of the positioning device according to the invention according to section II in FIG. 1 in the inactive position in a vertical orientation.

In the initial position of the positioning device 20 shown in FIGS. 1 and 2, the positioning device 20 is oriented with the muzzle part 14 of the setting tool 10 opposite the direction of the vector G of the force of gravity. The actuating element 24 is inactive and is displaced into the cup-shaped base part 26 to the maximum distance via the spring element 42. Therefore, the second switching member 34 is moved into the guide 44 in the coupling element 28 likewise to the maximum distance. The third switching member 35 and the rest of the switching link 30 with the driver 37 following in the direction of stroke are inactive.

FIG. 2 shows an enlarged view of the area of the positioning device 20 with the safety device 50 oriented to the vector G of gravitational force, shown in FIG. 1. As can be seen, the blocking element 55 or ball is situated completely in the first recess 51 in portion 46, more precisely in its radially circumferential pocket-shaped depression 53. The position of safety device 50 corresponds to an operational position 59 of the actuation switching means. In this orientation, the setting tool 10 at the positioning device 20 can be pressed with its muzzle part 14 against a ceiling or another construction element, and a setting process can be actuated by displacing the actuating element 24 relative to the coupling element 28 because the blocking element 55, in view of its position entirely inside the first recess 51, permits a movement of the first switching member 33 relative to the structural component part of the supporting structure or portion 46 of the coupling element 28. As can be seen from FIG. 3, the first switching member 33 is displaced by the actuating element 24 in direction of the first arrow 15 relative to the coupling element 28 and its portion 46. By means of the first switching member 33, the second switching member 34 (second arrow 16) and, along with it, the following portion of the switching link 30 up to the driver 37 for the actuation switch 13 is actuated (not shown in FIG. 3) by the intermediate element 47 so that the setting tool 14 is actuated at the connecting portion 22 in this orientation to the vector G of the gravitational force. Also, actuation is still possible at an inclination of the positioning device 20 to the illustrated orientation of a maximum of approximately 15° to 30° because the ball would still be held in the radially circumferential pocket-shaped depression 53 since the inclined surface 56 is at a tilting angle of less than 90° to an axis defined by the vector G of the force of gravity and the blocking element 55 and blocking ball are accordingly prevented from moving out of the pocket-shaped depression 53.

Figure 4:
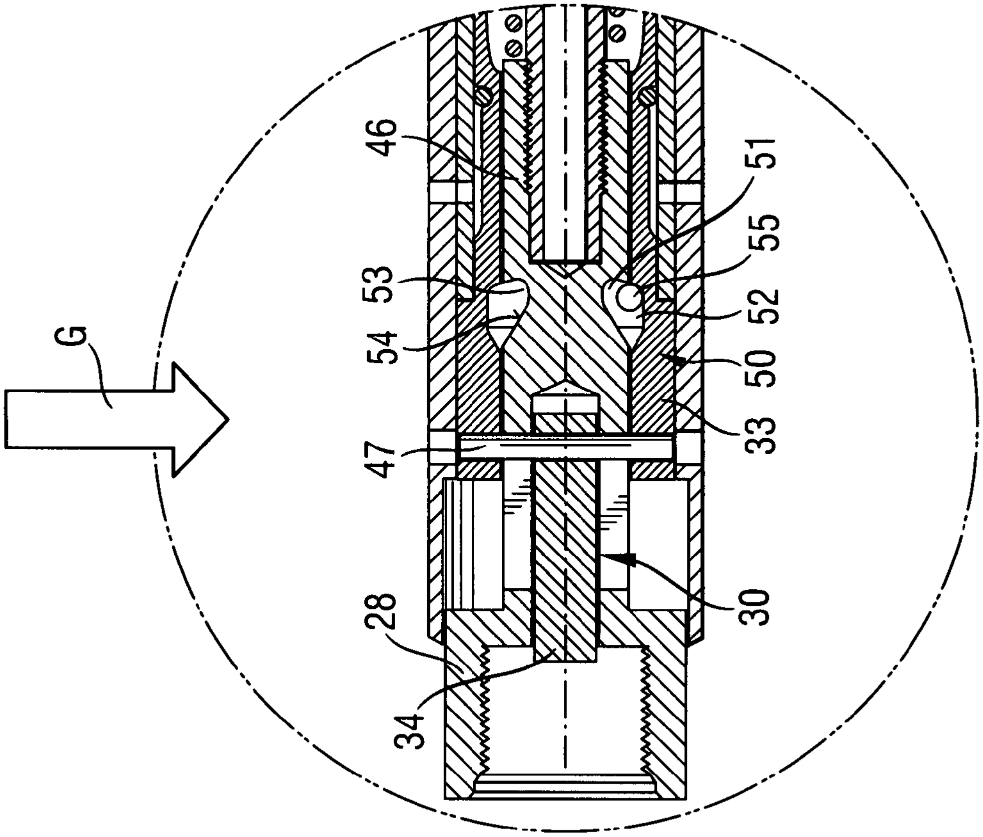
FIG. 4 a cross-sectional view of the detail of the positioning device shown in FIG. 2 in the inactive position in a horizontal orientation.
Figure 6:
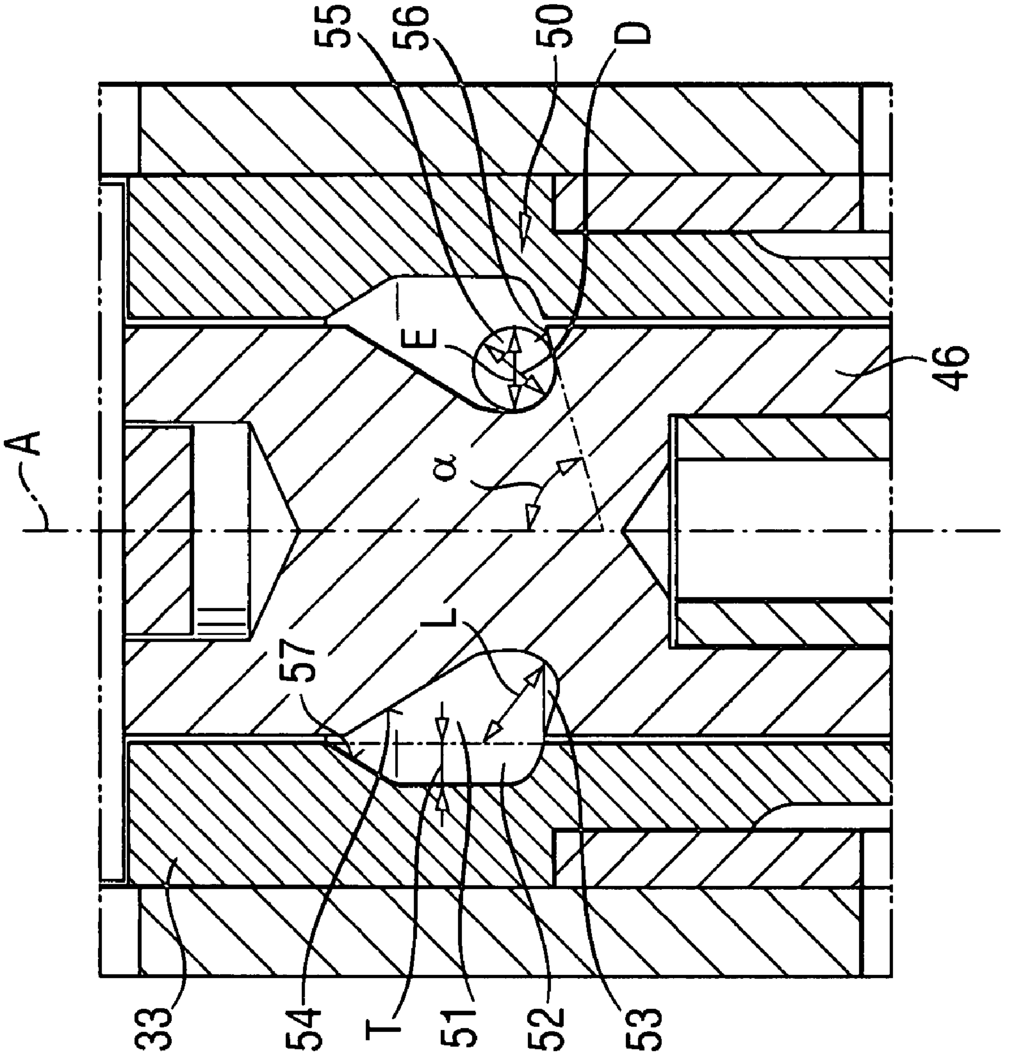
FIG. 6 a cross-sectional view of a detail of the positioning device shown in FIG. 2 at an increased, in comparison with FIG. 2, scale.

In FIG. 4, the area of the positioning device 20 with the safety device 50 is oriented with its longitudinal axis A, for example, at a right angle to the vector G of the force of gravity. As can be seen, the blocking element 55 or ball is now located partly in the second recess 52 in the first switching member 33 and partly in the first recess 51 in portion 46. Therefore, the safety device 50 is now located in its blocking position 58. If the setting tool 10 at the positioning device 20 is pressed against a construction element by the muzzle part 14 in this orientation, a setting process can no longer be initiated by displacing the actuating element 24 toward the coupling element 28 because the blocking element 55 in this blocking position 58, in view of its position in the two recesses 51, 52, only permits a movement of the first switching member 33 relative to the structural component of the supporting structure or portion 46 of the coupling element 28 for a very short distance which is shorter than the required switching stroke.

Figure 5:
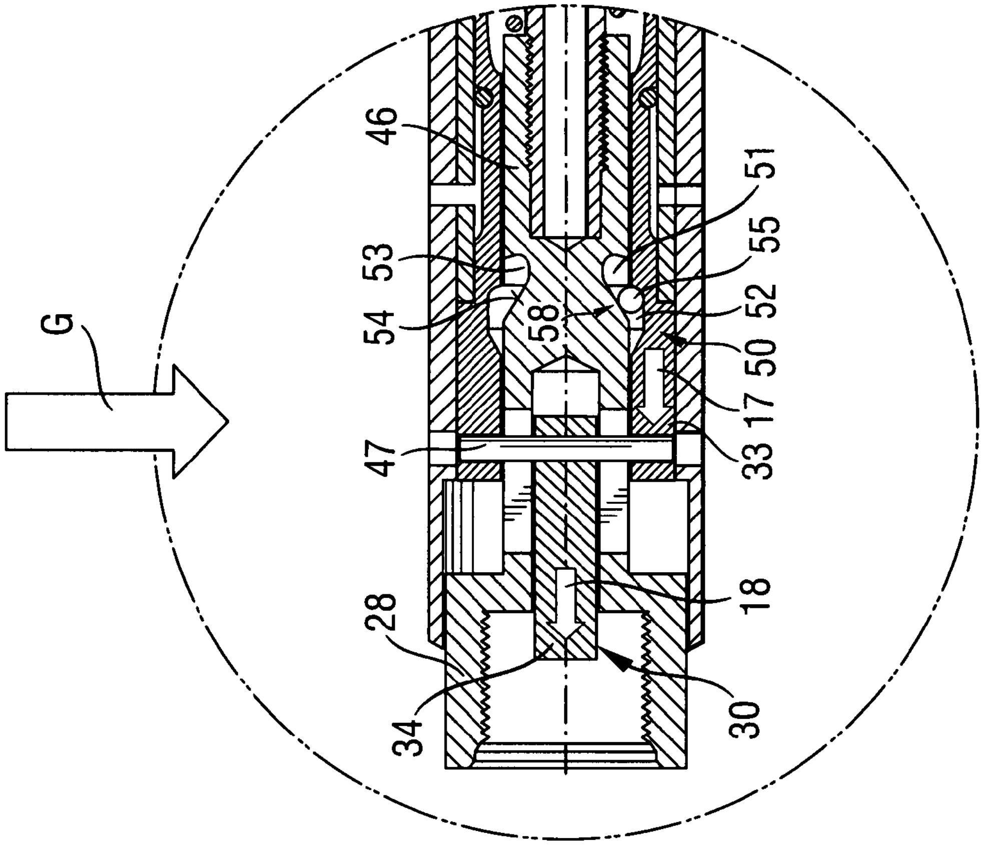
FIG. 5 a cross-sectional view of a detail of the positioning device shown in FIG. 2 in the horizontal orientation in a blocking position of the blocking element.

As can be seen from FIG. 5, the first switching member 33 can be displaced by a further distance by the actuating element 24 in direction of the third arrow 17 relative to the coupling part 28 and its portion 46. The second switching member 34 is now also displaced by the first switching member 33 by this same stroke length in direction of the fourth arrow 18 by means of the intermediate element 47. However, the following portion of the switching link 30 up to the driver 37 for the actuation switch 13 is either not actuated at all (not shown in FIG. 3) because a coupling is no longer produced, or is displaced only by an insufficiently long stroke so that the setting tool 10 at the connection part 22 is not actuated in this orientation to the vector G of the force of gravity. In all other orientations which deviate from the indicated inclination of approximately 0° to 15° (a maximum of 30° is also possible instead of 15°) to the orientation indicated in FIGS. 1 to 3, the safety device 50 behaves as described with reference to FIGS. 4 to 5 and prevents actuation.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A positioning device for a hand-held setting tool (10) having an actuation switch (13) for actuating the setting tool (10), the positioning device comprising a rod-shaped holder (21) defining a longitudinal axis (A); connection means (22) for the setting tool (10) arranged at an end of the holder (21); and actuating switching means including an actuation element (24), a switching link (30) for connecting an actuation element (24) to the actuation switch (13) of the setting tool (10) and having a switching member axially displaceable relative to a stationary, with respect to the holder, structural component, and a safety device (50) for preventing actuation of the actuation switch (13) at a predetermined orientation of the setting tool (10) and including a displaceable blocking element (55), a first annular recess (51) for receiving the blocking element and extending radially circumferentially about the structural component and a second annular recess (52) extending radially circumferentially about the switching member and located, at least in an initial position of the positioning device (20) radially opposite the first annular recess (51), the first annular recess (51) and the second annular recess (52) being open toward the switching member and the structural component, respectively, the blocking element (55) being completely positionable in one of the first and second annular recesses (51) in an operational position of the actuation switching means.

2. A positioning device according to claim 1, wherein the structural component is formed by a portion (46) of a coupling element (28).

3. A positioning device for a hand-held setting tool (10) having an actuation switch (13) for actuating the setting tool (10), the positioning device comprising a rod-shaped holder (21) defining a longitudinal axis (A); connection means (22) for the setting tool (10) arranged at an end of the holder (21); and actuating switching means including an actuation element (24), a switching link (30) for connecting an actuation element (24) to the actuation switch (13) of the setting tool (10) and having a switching member axially displaceable relative to a stationary, with respect to the holder, structural component, and a safety device (50) for preventing actuation of the actuation switch (13) at a predetermined orientation of the setting tool (10) and including a displaceable blocking element (55), a first annular recess (51) for receiving the blocking element and extending radially circumferentially about the structural component and a second annular recess (52) extending radially circumferentially about the switching member and located, at least in an initial position of the positioning device (20) radially opposite the first annular recess (51), the first annular recess (51) and the second annular recess (52) being open toward the switching member and the structural component, respectively, the blocking element (55) being completely positionable in one of the first and second annular recesses (51) in an operational position of the actuation switching means, wherein the structural component is formed by a portion (46) of a coupling element (28), wherein the switching member is a first switching member (33) of the switching link (30) which is sleeve-shaped and is guided over a radial outer surface of the portion (46) of the coupling element (28).

4. A positioning device for a hand-held setting tool (10) having an actuation switch (13) for actuating the setting tool (10), the positioning device comprising a rod-shaped holder (21) defining a longitudinal axis (A); connection means (22) for the setting tool (10) arranged at an end of the holder (21); and actuating switching means including an actuation element (24), a switching link (30) for connecting an actuation element (24) to the actuation switch (13) of the setting tool (10) and having a switching member axially displaceable relative to a stationary, with respect to the holder, structural component, and a safety device (50) for preventing actuation of the actuation switch (13) at a predetermined orientation of the setting tool (10) and including a displaceable blocking element (55), a first annular recess (51) for receiving the blocking element and extending radially circumferentially about the structural component and a second annular recess (52) extending radially circumferentially about the switching member and located, at least in an initial position of the positioning device (20) radially opposite the first annular recess (51), the first annular recess (51) and the second annular recess (52) being open toward the switching member and the structural component, respectively, the blocking element (55) being completely positionable in one of the first and second annular recesses (51) in an operational position of the actuation switching means, wherein the first and second annular recesses (51, 52) are formed as grooves which are closed in both axial directions.

5. A positioning device for a hand-held setting tool (10) having an actuation switch (13) for actuating the setting tool (10), the positioning device comprising a rod-shaped holder (21) defining a longitudinal axis (A); connection means (22) for the setting tool (10) arranged at an end of the holder (21); and actuating switching means including an actuation element (24), a switching link (30) for connecting an actuation element (24) to the actuation switch (13) of the setting tool (10) and having a switching member axially displaceable relative to a stationary, with respect to the holder, structural component, and a safety device (50) for preventing actuation of the actuation switch (13) at a predetermined orientation of the setting tool (10) and including a displaceable blocking element (55), a first annular recess (51) for receiving the blocking element and extending radially circumferentially about the structural component and a second annular recess (52) extending radially circumferentially about the switching member and located, at least in an initial position of the positioning device (20) radially opposite the first annular recess (51), the first annular recess (51) and the second annular recess (52) being open toward the switching member and the structural component, respectively, the blocking element (55) being completely positionable in one of the first and second annular recesses (51) in an operational position of the actuation switching means, wherein one of the first and second annular recesses (51) has a pocket-shaped depression (53) maximum length (L) of which is greater than a greatest extension (D) of the blocking element (55), and another of the recesses (52) has a maximum radial depth (T) which is smaller than a radial extension (E) of the blocking element (55).

6. A positioning device according to claim 5, wherein the pocket-shaped depression (53) is defined axially at its end remote from the connection means (22) by an inclined surface (56) which is inclined from an outer side to an inner side toward a free end (25) of the holder (21) relative to the longitudinal axis (A).

7. A positioning device according to claim 6, wherein an angle of inclination (a) of the inclined surface (56) to the longitudinal axis (A) is in the range of 60° to 75°.

8. A positioning device according to claim 5, wherein the first and second annular recesses (51, 52) form conical boundary surfaces (54, 57) at their axial ends remote from a free end (25), the conical boundary surfaces (54, 57) narrowing the first and second annular recesses (51, 52) in a direction away from the free end of the holder (21).

* * * * *